(12) United States Patent
Black et al.

(10) Patent No.: US 11,296,508 B2
(45) Date of Patent: Apr. 5, 2022

(54) HIERARCHICAL OPERATIONAL CONTROL OF AGGREGATED LOAD MANAGEMENT RESOURCES

(71) Applicant: Battelle Memorial Institute, Columbus, OH (US)

(72) Inventors: Jason W. Black, Dublin, OH (US); Bradley C. Glenn, Columbus, OH (US); Eric Rehberg, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 372 days.

(21) Appl. No.: 16/661,443

(22) Filed: Oct. 23, 2019

(65) Prior Publication Data

US 2020/0059094 A1 Feb. 20, 2020

Related U.S. Application Data

(62) Division of application No. 14/976,663, filed on Dec. 21, 2015, now Pat. No. 10,490,999.

(Continued)

(51) Int. Cl.
*H02J 3/14* (2006.01)
*H02J 3/00* (2006.01)
(Continued)

(52) U.S. Cl.
CPC .............. *H02J 3/144* (2020.01); *B60L 53/63* (2019.02); *B60L 53/665* (2019.02); *H02J 3/005* (2013.01);
(Continued)

(58) Field of Classification Search
CPC ...... H02J 3/06; H02J 3/14; H02J 3/144; H02J 2003/007; Y04S 20/222; Y04S 40/22;
(Continued)

(56) References Cited

U.S. PATENT DOCUMENTS 8,019,697 B2 * 9/2011 Ozog ................. G06Q 30/0283
705/412
8,178,997 B2 * 5/2012 Talkin ................. H02J 13/0079
307/41

(Continued)

FOREIGN PATENT DOCUMENTS

JP 04279963 A 10/1992

OTHER PUBLICATIONS

Fanney et al.; The Thermal Performance of Residential Electric Water Heaters Subjected to Various Off-Peak Schedules; Journal of Solar Energy Engineering; vol. 118; pp. 73-80; 1996.

(Continued)

*Primary Examiner* — Crystal J Barnes-Bullock
(74) *Attorney, Agent, or Firm* — Fay Sharpe LLP

(57) ABSTRACT

An aggregation comprises: loads that draw electricity, and a hierarchy including a root dispatch engine at the top of the hierarchy, downstream dispatch engines each servicing downstream points comprising further downstream dispatch engines or loads, and the loads at the bottom of the hierarchy. Each downstream dispatch engine sends draw dispatches to its downstream points such that the total draw computed by summing the draw dispatches equals a draw dispatch received by the downstream dispatch engine from the dispatch engine above it in the hierarchy. The sent draw dispatches also satisfy downstream point draw constraints communicated to the downstream dispatch engine from its downstream points. In a method, a baseline long-term draw dispatch is determined for the aggregation, and the baseline long-term draw dispatch is modulated over a shorter time interval based on a short-term draw requirement to determine a draw dispatch for the aggregation.

18 Claims, 5 Drawing Sheets

Related U.S. Application Data

(60) Provisional application No. 62/095,642, filed on Dec. 22, 2014.

(51) Int. Cl.
*H02J 3/32* (2006.01)
*B60L 53/66* (2019.01)
*B60L 53/63* (2019.01)

(52) U.S. Cl.
CPC ............ *H02J 3/32* (2013.01); *Y02B 70/3225* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 20/222* (2013.01); *Y04S 30/14* (2013.01)

(58) Field of Classification Search
CPC ... Y04S 40/121; Y02B 70/3225; Y02E 60/76; G05B 13/04; G05B 15/02; G05F 1/66; G06F 1/3203
See application file for complete search history.

(56) References Cited

U.S. PATENT DOCUMENTS

| | | | |
|---|---|---|---|
| 8,364,609 B2 * | 1/2013 | Ozog | .............. H02J 13/0006 705/412 |
| 8,375,229 B2 | 2/2013 | Saeki | |
| 8,633,619 B2 | 1/2014 | Robinson | |
| 8,638,011 B2 | 1/2014 | Robinson | |
| 8,706,650 B2 * | 4/2014 | Ozog | ..................... G06Q 10/06 705/412 |
| 8,775,846 B2 | 7/2014 | Robinson | |
| 8,796,881 B2 | 8/2014 | Davis | |
| 9,281,690 B2 | 3/2016 | Eldershaw | |
| 9,283,862 B2 | 3/2016 | Bridges | |
| 9,287,710 B2 * | 3/2016 | Talkin | ....... H02J 3/14 |
| 9,537,313 B2 | 1/2017 | Thornton | |
| 9,634,491 B2 | 4/2017 | Robinson | |
| 9,727,931 B2 * | 8/2017 | Kubota | ............. H02J 3/00 |
| 9,891,645 B2 * | 2/2018 | Yu | ........... G06Q 10/06 |
| 10,333,315 B2 | 6/2019 | Robinson | |
| 10,606,296 B2 * | 3/2020 | Mokhtari | ................. G05F 1/66 |
| 11,101,651 B2 * | 8/2021 | Pavlak | ................... G05B 15/02 |
| 2007/0300083 A1 | 12/2007 | Goodrum | |
| 2012/0330473 A1 | 12/2012 | Meredith | |
| 2014/0214227 A1 | 7/2014 | Thornton | |
| 2015/0120077 A1 | 4/2015 | Kumazawa | |
| 2016/0118795 A1 | 4/2016 | Berkowitz | |

OTHER PUBLICATIONS

Vrettos et al.; Load Frequency Control by Aggregations of Thermally Stratified Electric Water Heaters; Innovative Smart Grid Technologies (ISGT Europe); 2012.

Koch, S.; Demand Response Methods for Ancillary Services and Renewable Energy Integration in Electric Power Systems; Dipl.-Ing., University of Stuttgart; Diss. No. 20470; 2012.

* cited by examiner

HIERARCHICAL OPERATIONAL CONTROL OF AGGREGATED LOAD MANAGEMENT RESOURCES

This application is a divisional application of U.S. patent application Ser. No. 14/976,663 filed Dec. 21, 2015 and titled "HIERARCHICAL OPERATIONAL CONTROL OF AGGREGATED LOAD MANAGEMENT RESOURCES" which claims the benefit of U.S. Provisional Application No. 62/095,642 filed Dec. 22, 2014 and titled "HIERARCHICAL OPERATIONAL CONTROL OF AGGREGATED LOAD MANAGEMENT RESOURCES". U.S. patent application Ser. No. 14/976,663 filed Dec. 21, 2015 and U.S. Provisional Application No. 62/095,642 filed Dec. 22, 2014 are incorporated herein by reference in their entirety.

BACKGROUND

The following relates to the electrical power grid arts, electrical power grid frequency control arts, and related arts.

In conventional electrical power grid management, electrical power generation is controlled to match the current power demand. This approach requires making adequate provision for peak load by providing a source of excess power generating capacity, for example by providing ancillary generators that are brought on-line at peak demand hours. The excess power generating capacity is not used except during peak demand periods, and usually represents a net cost for the utility provider. Other approaches for matching generation to demand include shifting power between geographical grid regions, which again usually represents a net cost to the utility due to transmission line losses and so forth.

In demand response systems, loads (i.e. demand) are adjusted to match the available power generation. This approach can be cost effective since the utility can provide less excess power generating capacity. Commercial models for demand response systems typically include some incentive mechanism to induce load owners to participate in the demand response system. The Federal Energy Regulatory Commission (FERC) has codified incentivizing demand response systems in Order No. 745 issued March 2011, which mandates compensation for providers of demand response participating in the wholesale power marketplace.

By way of illustrative example, some demand response systems are described in Kirby & Staunton, "Technical Potential for Peak Load Management Programs in New Jersey", Oak Ridge National Laboratory ORNL/TM-2002/271 (October 2002), and Kirby, "Spinning Reserve From Responsive Loads", Oak Ridge National Laboratory ONRL/TM-2003/19 (March 2003). These references disclose loads operated as contingency reserves marketed on the day-ahead or hour-ahead markets. For example, spinning reserve may be provided using aggregations of air conditioners, water heaters, or so forth. A wireless communication network including the Internet is employed to send curtailment commands to thermostats which respond by taking immediate action or adjusting their schedules for future action. The thermostats send back data on temperature, set point, and power consumption. Thermostats can be addressed individually, in groups, or in total.

Brooks et al., "PG & E and Tesla Motors: Vehicle to Grid Demonstration and Evaluation Program, EVS23 (2007) discloses another illustrative example, in which an aggregation of loads in the form of electric vehicle battery chargers is leveraged to perform ancillary services for the grid, including frequency regulation based on an automatic generation control (AGC) signal. In a disclosed approach, a preferred operating point is defined, and the market value of regulation is based on deviations from this preferred operating point.

A difficulty with demand response systems is that the grid-level commands to adjust load draw (power or average energy over some time interval) can conflict with other limitations imposed on the loads. A common concern is interference with the intended use of the load. For example, operating an air conditioner continuously to provide increased draw can result in the air conditioned space becoming too cool; conversely, turning off the air conditioner for too long can result in the space becoming too hot. The use of an aggregation of loads can alleviate these problems, as loads can be prioritized to run (or not run) based on their current state, e.g. if increased draw is needed then those air conditioners whose thermostats are reading a high temperature are chosen to run first, before running air conditioners whose thermostats are reading a low temperature.

However, such load aggregation approaches cannot remediate other types of possible conflicts. For example, the call for increased demand may conflict with circuit-level limitations on current draw imposed by circuit breakers, or different types of ancillary services executing concurrently may also conflict. For example, a curtailment command (which requires reducing draw) may conflict with operation of the load for frequency regulation in which the automatic generation control (AGC) signal calls for increased draw to reduce a high grid frequency.

Disclosed herein are approaches for addressing such conflicts and/or other disadvantages of existing demand response systems employing load aggregation.

BRIEF SUMMARY

In some illustrative embodiments disclosed as illustrative examples herein, a method operates on an aggregation of loads that draw electricity. The aggregation of loads is divided into a plurality of load sub-aggregations. The method comprises: determining load sub-aggregation draw constraints for the load sub-aggregations; computing sub-aggregation draw dispatches for the load sub-aggregations that simultaneously satisfy a draw requirement for the aggregation of loads and the determined load sub-aggregation draw constraints; for each load sub-aggregation, determining load dispatches for the loads of the load sub-aggregation to satisfy the draw dispatch computed for the load sub-aggregation; communicating the load dispatches to the loads of the aggregation of loads; and operating the loads of the aggregation of loads in accord with the communicated load dispatches.

In some illustrative embodiments disclosed as illustrative examples herein, an aggregation comprises: loads that draw electricity, and a hierarchy including (1) a root dispatch engine at the top of the hierarchy, (2) downstream dispatch engines each servicing downstream points comprising one or both of further downstream dispatch engines and loads, and (3) said loads at the bottom of the hierarchy. The dispatch engines comprise electronic data processing devices. Each downstream dispatch engine is configured to send draw dispatches to its downstream points such that the total draw computed by summing the draw dispatches equals a draw dispatch received by the downstream dispatch engine from the dispatch engine above it in the hierarchy. The sent draw dispatches also satisfy downstream point draw constraints communicated to the downstream dispatch engine from its downstream points. In some illustrative embodiments, the aggregation conveys constraints upward through the hierarchy and conveys draw dispatches downward through the hierarchy.

In some illustrative embodiments disclosed as illustrative examples herein, a method is disclosed for operating on an aggregation of loads that draw electricity. The method comprises: determining a baseline long-term draw dispatch for the aggregation based on a long-term draw requirement over a first time interval; modulating the baseline long-term draw dispatch over a second time interval shorter than the first time interval based on a short-term draw requirement to determine a draw dispatch for the aggregation; determining load dispatches for the loads of the aggregation to satisfy the draw dispatch for the aggregation; communicating the load dispatches to the loads of the aggregation; and operating the loads of the aggregation in accordance with the communicated load dispatches. The long-term draw requirement may, for example, be a load shifting command, possibly comprising an indication of the power generation level of a wind farm, photovoltaic farm, or other intermittent power generation source. The short-term draw requirement may, for example, be a frequency regulation (FR) draw requirement generated based on an automatic generation control (AGC) signal. In some embodiments the short-term draw requirement averages to zero over the first time interval. In some embodiments the first time interval is on the order of minutes or hours and the second time interval is on the order of seconds.

In some illustrative embodiments disclosed as illustrative examples herein, a method is disclosed for operating on an aggregation of loads that draw electricity from an electrical power grid. The method comprises optimizing load dispatches $P_l$ for the loads of the aggregation where $l=1, \ldots, L$ indexes the loads of the aggregation by minimizing a performance measure or total cost function C using a constrained cost minimization with respect to the draw dispatches $P_l$, where the cost includes cost components indexed $g=1, \ldots, G$, a cost is associated with the $g^{th}$ goal for load l, a priority weight $w_g$ is assigned to the $g^{th}$ goal, and $P_{req}$ is a draw requirement for the aggregation of loads. The method further comprises communicating the load dispatches $P_l$ to the loads of the aggregation, and operating the loads of the aggregation in accord with the communicated load dispatches $P_l$. The constrained cost minimization may be further constrained by constraints on one or more loads of the aggregation. The method may further comprise generating the draw requirement $P_{req}$ for the aggregation of loads from an automatic generation control (AGC) signal provided by the electrical power grid.

DETAILED DESCRIPTION

Figure 1:
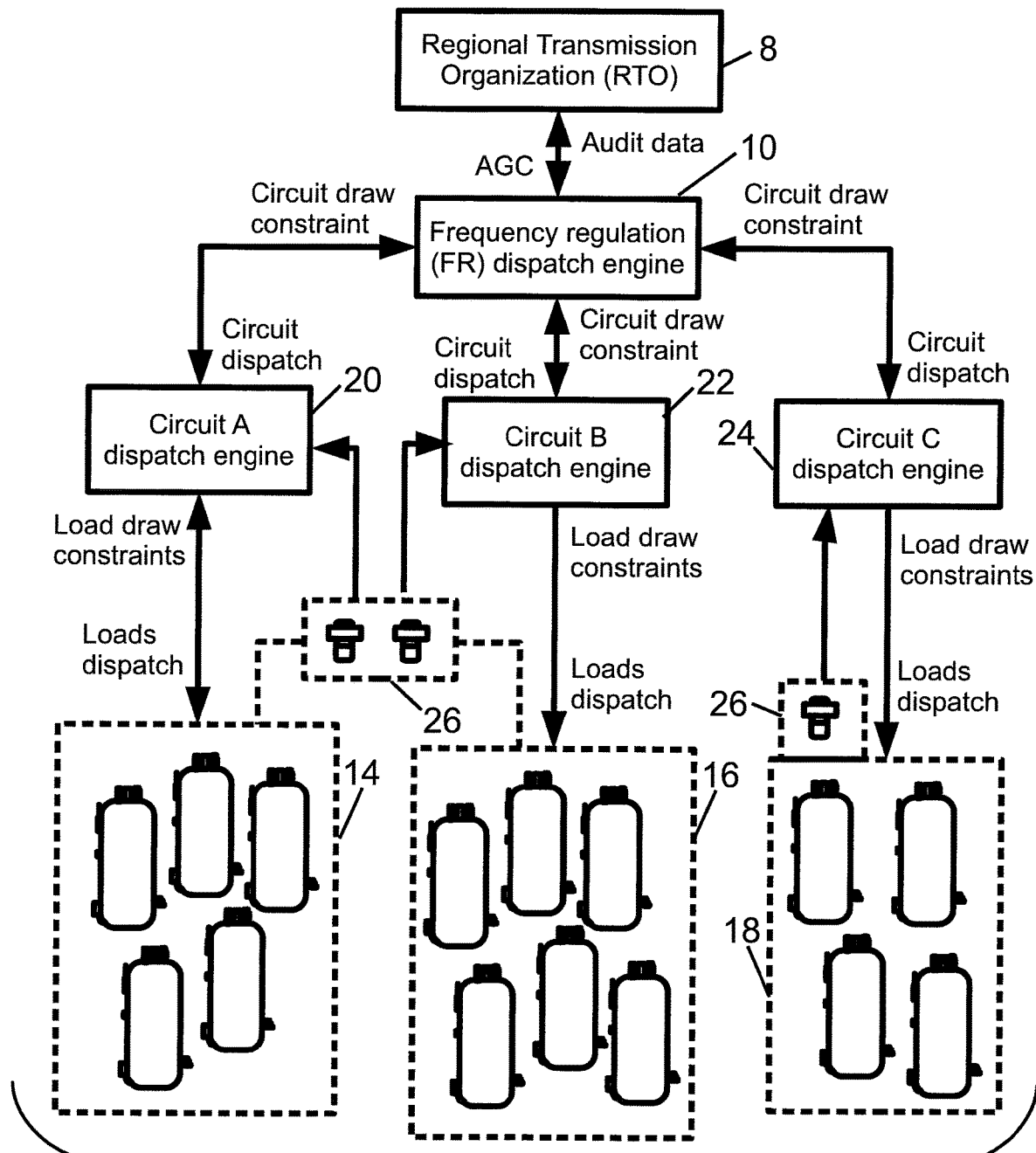
FIG. 1 diagrammatically shows a demand response system employing an aggregation of loads that is divided into sub-aggregations on the basis of common power delivery circuits.

Disclosed herein are systems and methods for implementing hierarchical control of aggregated load resources for grid operations, which operate by dynamically aggregating and dispatching loads to meet multiple operational requirements. The system or method is implemented such that there is a single aggregation group serving the highest/largest operational requirement (e.g. grid balancing or another ancillary service provided to the grid) and sub-groups that are simultaneously providing lower level services (e.g. reducing load on a particular feeder/transformer). This approach allows individual loads to participate in multiple operational load management programs simultaneously. For instance, a single water heater may simultaneously participate in a frequency regulation program for transmission operations and a voltage support program for distribution level operations.

To maximize the potential operational benefits from load management programs, it is advantageous to utilize any individual load to provide multiple services across geography and/or time scales. In practice, however, there is a potential for competing or contradictory requirements when a single load is providing multiple services simultaneously. Systems and methods disclosed herein enable loads to simultaneously provide multiple operational services by creating and dispatching dynamic aggregation groups and reallocating requirements across groups to meet requirements at different (e.g. global versus local) levels.

In one example embodiment, an aggregation is divided into: a group of water heaters residing on the same electrical circuit (Circuit A); and another group of water heaters residing on an adjacent circuit (Circuit B). All the water heaters are in general able to provide a service to the electrical grid, such as frequency regulation, spinning reserves, load shifting, or so forth, where the operational objective resides at the transmission, wholesale, or bulk grid level. At the same time, there may be operational issues at the circuit level (such as overloads, voltage swings, or so forth) that only the loads on a circuit may provide support to alleviate. Under our system, the loads on Circuit A may, for example, provide both voltage support on Circuit A and frequency regulation for the entire system. When a scenario arises in which the bulk requirement contradicts the local requirement (i.e. local constraint), the local requirement will be served first (since this typically has a subset of the population of responsive loads) and then the remaining population of loads will be dispatched to meet the bulk (or higher level) requirement. There can be as many levels of control as practicable by the number of loads and the size of the requirements at each level. Thus, a multi-level hierarchy is present.

To allow for this satisfaction of multi-level requirements, subgroups of aggregated loads are suitably defined at each level, and only the appropriate group used to meet the requirements at its level. For the above example, the loads in Circuit A may be dispatched to increase the total load on the circuit in order to absorb excess distributed power generation and prevent reverse power flows or overvoltages. At the same time, there may be an excess of total load at the bulk system level, which calls for the total usage of the entire aggregated fleet of water heaters to be reduced. The disclosed system first dispatches the water heaters on Circuit A to meet the requirement there (at the level of Circuit A), and then dispatches the remaining water heaters (in this case from Circuit B) to reduce the total load on the system. In this scenario, the second dispatch includes the original bulk load reduction requirement plus a constraint of an additional amount of load reduction to make up for the load additions on Circuit A). In a similar fashion, the disclosed systems and methods may also be applied for requirements that vary across time, but not geography, in which case the long term objectives will be met first, and then short term objectives.

If there are insufficient resources at each level to meet the associated requirements at any given time, then the system suitably utilizes weighting functions to develop a prioritization scheme to allocate resources across the different objectives. In one approach, the prioritization scheme always satisfy local requirements, and then as much of remaining bulk requirement as possible. In another approach, the prioritization scheme evenly distributes resources across levels.

As used herein, the term "draw" denotes either a power draw (for example, measured in watts) or an energy draw averaged over a designated time interval (for example, measured in joules or kilowatt-hours (kWh)). In the following, various draw values are denoted using the letter P (with appropriate subscripts or other auxiliary notation).

With reference to FIG. 1, an electrical grid operator, such as an illustrative regional transmission organization (RTO) 8, operates to generate an automatic generation control (AGC) signal that is communicated to a frequency regulation (FR) dispatch engine 10 that services an aggregation of loads 12 that draw electricity from the electrical grid. While in the illustrative example the root dispatch engine of the hierarchy provides FR to the grid, more generally the root dispatch engine can service some other need, such as providing spinning reserve, load shifting, or so forth. The illustrative loads 12 are water heaters; more generally, the loads can be any devices that draw electricity, such as heating, ventilation, and air conditioning (HVAC) units, dishwashers, or so forth. The aggregation of loads 12 is divided into sub-aggregations that each service some need other than FR. In the illustrative example, the sub-aggregations are defined by electrical circuits: a sub-aggregation 14 is served by a common electrical circuit denoted herein without loss of generality as "Circuit A"; a sub-aggregation 16 is similarly served by a common electrical circuit denoted as "Circuit B"; and a sub-aggregation 18 is served by a common electrical circuit denoted herein as "Circuit C". Each sub-aggregation is serviced by a dispatch engine for that sub-aggregation: the "Circuit A" sub-aggregation 14 is serviced by a Circuit A dispatch engine 20; the "Circuit B" sub-aggregation 16 is serviced by a Circuit B dispatch engine 22; and the "Circuit C" sub-aggregation 18 is serviced by a Circuit C dispatch engine 24.

The dispatch engine 20, 22, 24 for each respective sub-aggregation 14, 16, 18 receives information from the loads of that sub-aggregation, such as metered power via power meters 26. Based on this information, each downstream dispatch engine 20, 22, 24 determines whether to impose any load sub-aggregation draw constraints on its serviced load. For example, such a constraint may be intended to prevent overload of the circuit, or limit voltage swings on the circuit, or so forth. In determining whether to impose any load sub-aggregation draw constraints on its serviced load, the dispatch engine may utilize a priori knowledge of the circuit such as its circuit breaker current limit, rated power, or so forth.

Each circuit dispatch engine 20, 22, 24 communicates its load sub-aggregation (circuit) draw constraint(s), if any, to the root (FR) dispatch engine 10. The FR dispatch engine 10 then computes sub-aggregation draw dispatches for the load sub-aggregations that simultaneously satisfy a draw requirement for the aggregation of loads 12 and the determined load sub-aggregation draw constraints. In the illustrative case, the draw requirement for the aggregation of loads 12 is determined to provide frequency regulation based on the AGC signal from the RTO 8. In a suitable approach, the FR dispatch engine 10 schedules the aggregation 12 for a baseline draw. The FR dispatch engine 10 controls the loads 12 adjusts power draw of the aggregation 12 upward (more load) respective to the baseline in response to the AGC indicating a high grid frequency condition, and adjusts power draw of the aggregation 12 downward (less load) respective to the baseline in response to the AGC indicating a low grid frequency condition. The deviation from baseline serves as suitable audit data conveyed to the RTO 8 to provide an auditable record of the FR capacity provided by the aggregation 12. The circuit draw dispatches are communicated from the FR dispatch engine 10 to the respective downstream circuit dispatch engines 20, 22, 24.

At each circuit dispatch engines 20, 22, 24, load dispatches are determined for the loads of the controlled load sub-aggregation to satisfy the (circuit) draw dispatch computed for the load sub-aggregation at the FR dispatch engine 10. The load dispatches may, for example, be "on" or "off" dispatches that turn individual water heaters on or off, taking into account an urgency state. For example, each water heater can convey to the dispatch engine its need to run (highest if the water temperature is at its lowest point within its thermostat control band, and lowest if the water temperature is at its highest point within its thermostat control band) and the load dispatches direct those water heaters with highest urgency to run until the draw dispatch for the circuit is satisfied. For other types of loads, the load dispatches may be real-valued, for example identifying the kW power draw. The load dispatches are communicated to the loads, and the loads operate in accordance with the communicated load dispatches.

Figure 2:
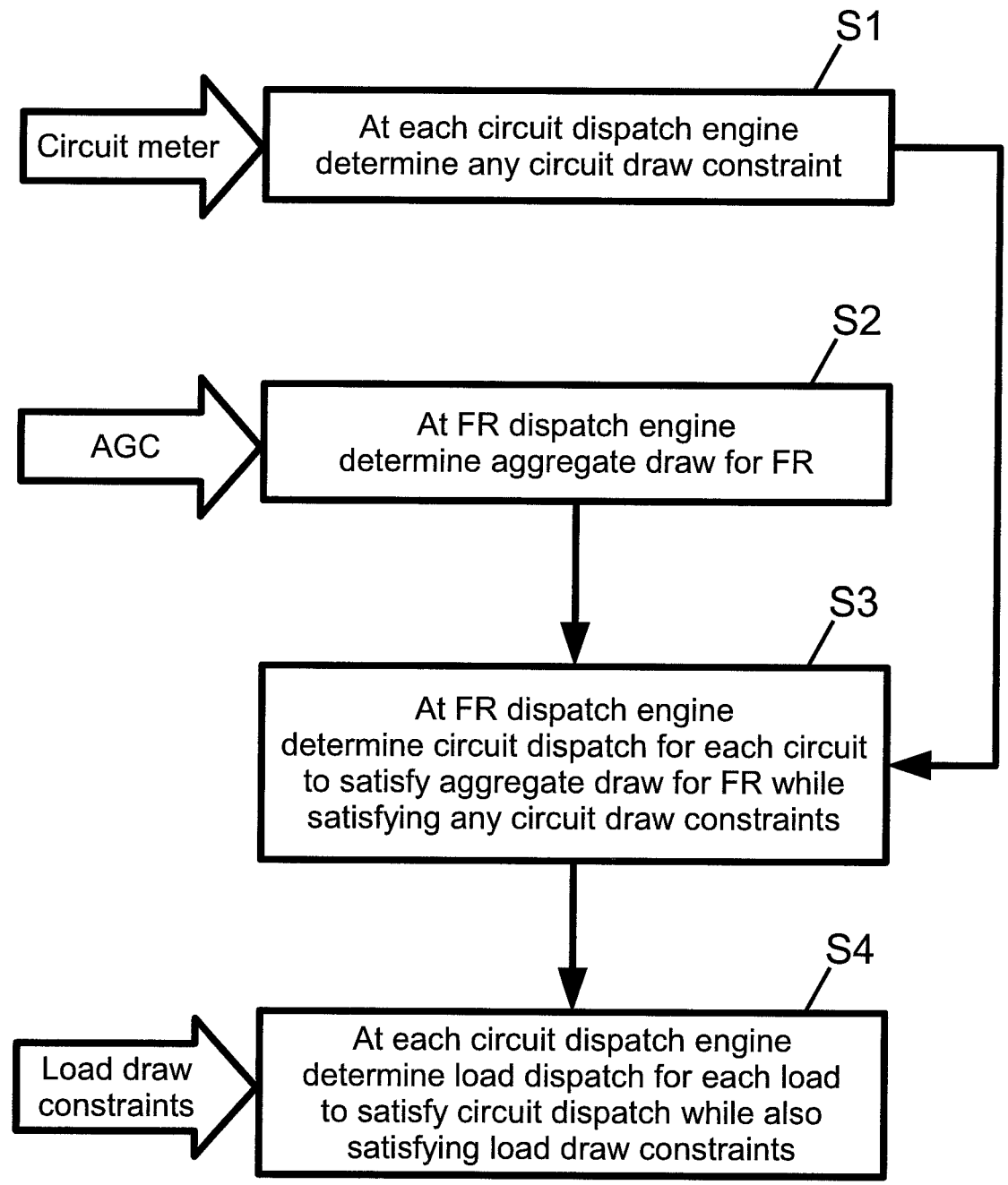
FIG. 2 diagrammatically shows a method suitably performed by the demand response system of FIG. 1 for providing frequency regulation service to the electric grid while also obeying operational constraints on power handled by the various electrical circuits feeding the aggregation.

With continuing reference to FIG. 1 and with further reference to FIG. 2, a control process suitably performed by a system such as that of FIG. 1 is described. In this control process, the number of circuits is generically denoted as C (where C is an integer greater than or equal to two), and the circuits are indexed by c=1, . . . , C. The draw dispatch for each circuit is denoted $P_c$ and so the total draw dispatch for the aggregation can be written as $\Sigma_{c=1}^{C} P_c$. In an operation S1, at each circuit dispatch engine 20, 22, 24 any circuit draw constraint is determined. The circuit draw constraints are generically denoted as $K_c$, c=1, . . . , C. A given circuit draw constraint $K_c$ may be a required circuit draw, for example, $K_c$=300 W indicating the circuit must draw 300 watts of power. Alternatively, a circuit draw constraint may be a limit or a set of limits on the circuit power draw. For example the circuit draw constraint $K_c \leq 300$ W indicates the circuit c must draw no more than 300 watts. The circuit draw constraint $K_c \geq 50$ W indicates the circuit c must draw at least 50 watts. The circuit draw constraint $K_c \geq 50$ W AND $K_c \leq 300$ W indicates the circuit c must draw between 50 watts and 300 watts. In the operation S1, at each circuit dispatch engine 20, 22, 24 the circuit draw constraint (if any) is determined, that is, the value of $K_c$ for each circuit c=1, . . . , C is determined, and this circuit draw constraint is communicated to the FR dispatch engine 10. If a circuit has no draw constraint, this is suitably communicated, for example by setting $K_c=0$ to indicate that circuit c has no draw constraint.

In an operation S2 performed at the frequency regulation dispatch engine, the aggregate draw required for frequency regulation, denoted here as $P_{FR}$, is determined based on the received automatic generation control (AGC) signal received from the RTO or other grid operator.

In an operation S3, the information obtained at the frequency regulation dispatch engine from operations S1 and S2 are used to determine a circuit draw dispatch $P_c$ for each circuit c=1, . . . , C such that the aggregate draw $P_{FR}$ is satisfied while all circuit draw constraints are also satisfied. This can be written as:

$$P_{FR} = \sum_{c=1}^{C} P_c \text{ s.t. } P_c \text{ satisfies } K_c \text{ for } c = 1, \ldots, C \quad (1)$$

where s.t. denotes "subject to". This is a constrained optimization problem in which the draw dispatches $P_1$, $P_2$, . . . , $P_C$ are to be optimized subject to respective equality and/or inequality constraints $K_1$, $K_2$, . . . , $K_C$. The constrained optimization of Expression (1) can be solved using a constrained optimization algorithm suitable for the specified constraints, such as linear programming in the case of equality and/or inequality constraints. If the number of circuits is relatively small, then an iterative solution approach may be feasible, such as gradient descent or Levenberg-Marquardt, in which the parameter constraints $K_c$ are applied in each iteration to prevent the parameters from violating their respective constraints. The optimized outputs $P_1$, $P_2$, . . . , $P_C$ serve as the circuit dispatch values, and are sent to the respective circuit dispatch engines 20, 22, 24. The optimization may be performed over various time horizons, e.g. a horizon of a day, a week, a month, or so forth, and updates are performed on a shorter basis, e.g. every second, minute, hour, day, or so forth.

In an operation S4, at each circuit dispatch engine 20, 22, 24, the load dispatches are determined for the loads of the circuit so as to satisfy the circuit dispatch (in other words, load dispatches $P_l$ are determined so that $P_c=\sum_{l=1}^{L_c} P_l$ where the summation l=1, . . . , $L_c$ is over the loads on the circuit c, and $P_l$ is the load dispatch for load l). Additionally, the load dispatches $P_l$ should satisfy any load constraints (for example, a water heater at its lowest allowable thermostat temperature may be required to run, whereas a water heater at its highest allowable thermostat temperature may be required to not run). Thus, this is again a constrained optimization which is analogous to Expression (1), but at the load sub-aggregation level.

In some contemplated embodiments, the circuit draw constraints are always required circuit draws, for example, $K_c=300$ W indicating the circuit must draw 300 watts of power. In this case, the set of constrained circuits can be written as $S_K$ and the set of unconstrained circuits as $S_{\bar{K}}$, and Expression (1) can be written as:

$$P_{FR} = P_K + \sum_{c \in S_{\bar{K}}} P_c = \sum_{c \in S_K} K_c + \sum_{c \in S_{\bar{K}}} P_c \quad (2)$$

where $P_K = \sum_{c \in S_K} K_c$ is the total required draw of the constrained circuits, and the optimization is over circuit draw dispatches $P_c$, $c \in S_{\bar{K}}$. In this case, the draw dispatches for those circuits having circuit draw constraints are equal to the constraints (required circuit draws), i.e. $P_c=K_c$ for all $c \in S_K$, and so those draw dispatches are effectively determined first, at the respective circuit dispatch engines for circuits $c \in S_K$.

Figure 3:
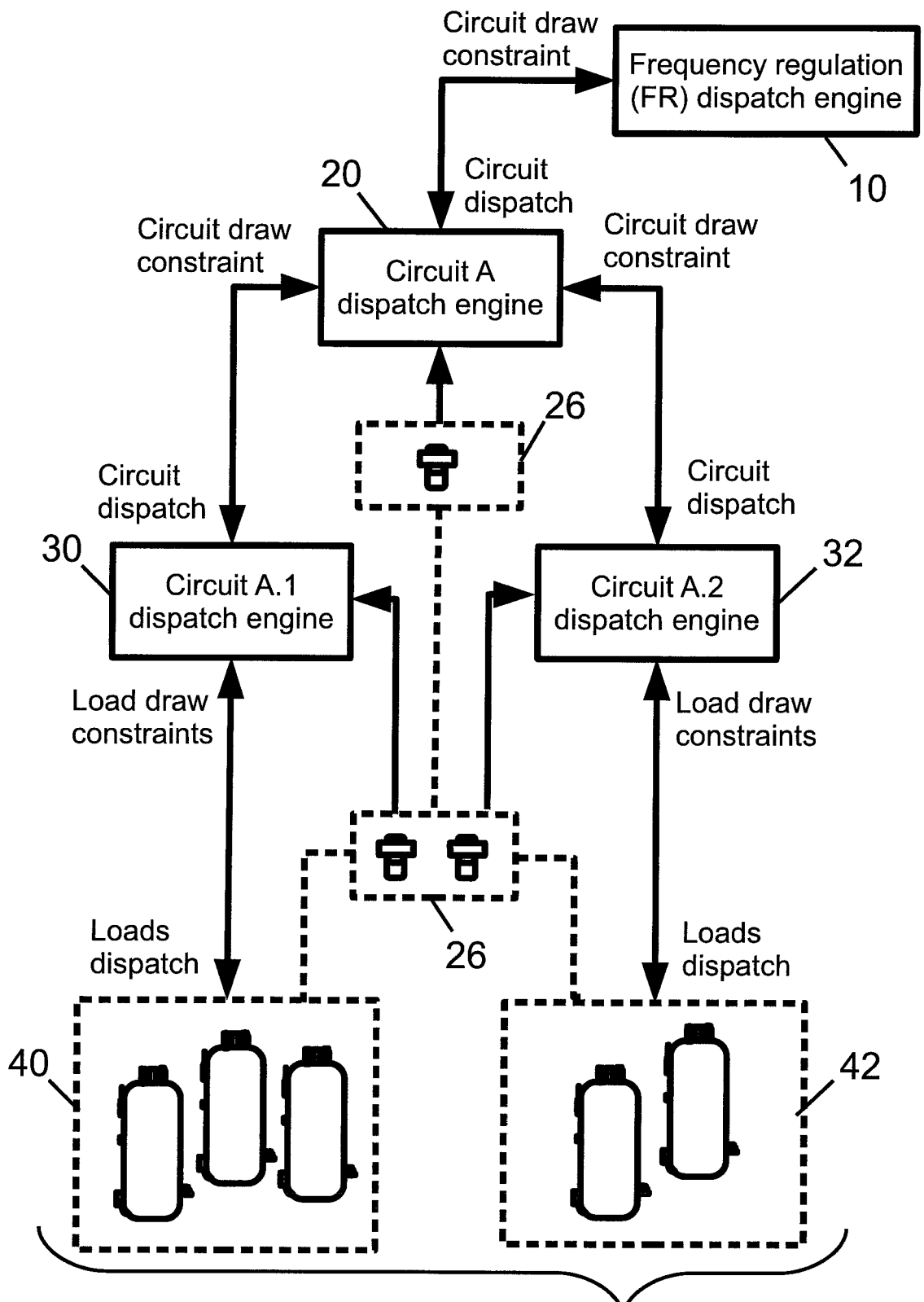
FIG. 3 diagrammatically shows a hierarchical extension of Circuit A of the demand response system of FIG. 1 so as to illustrate a multi-level hierarchical extension of the demand response system of FIG. 1.

With reference to FIG. 3, the hierarchical aggregation control can be extended to hierarchies with additional levels. In illustrative FIG. 3, the sub-aggregation 14 on Circuit A is itself divided into two sub-circuits, namely Circuit A.1 and Circuit A.2, having respective dispatch engines 30, 32 which are downstream of the Circuit A dispatch engine 20. Dispatch engine 30 services a load sub-aggregation 40 on Circuit A.1, while dispatch engine 32 services a load sub-aggregation 42 on Circuit A.2. The Circuit A.1 dispatch engine 30 determines a circuit draw constraint (if any) for the load sub-aggregation 40 on Circuit A.1. The Circuit A.2 dispatch engine 32 determines a circuit draw constraint (if any) for the load sub-aggregation 42 on Circuit A.2. These constraints are communicated to the higher-level Circuit A dispatch engine 20, which operates as already described except that it calculates (sub-)circuit dispatches for the load sub-aggregations 40, 42, rather than calculating the load dispatches directly. The dispatch engine 30 then generates the load dispatches for the loads in its sub-aggregation 40 in order to satisfy the (sub-)circuit dispatch received from the Circuit A dispatch engine 20, and similarly the dispatch engine 32 generates the load dispatches for the loads in its sub-aggregation 42 in order to satisfy the (sub-)circuit dispatch received from the Circuit A dispatch engine 20. It will be appreciated that this approach can be readily extended to additional hierarchical levels.

In the illustrative examples of FIGS. 1-3, the loads of the aggregation 12 are divided into sub-aggregations based on electrical layout as defined by the load-servicing circuit. This is a type of spatial or geographical division, although it will be appreciated that the loads of different circuits might actually overlap in space. For example, in a commercial building all water heaters may be on one circuit, while all HVAC units in the same commercial building may be on a different circuit. In this case, the water heaters are suitably one sub-aggregation and the HVAC units are suitably another sub-aggregation. Other types of spatial division are contemplated, which may not be defined by the circuit (i.e. electrical layout). For example, loads may be divided by geographical area, with sub-aggregations for different geographical areas serving more local needs such as load shifting while the combined aggregation serves FR or some other need spanning a larger geographical area.

Figure 4:
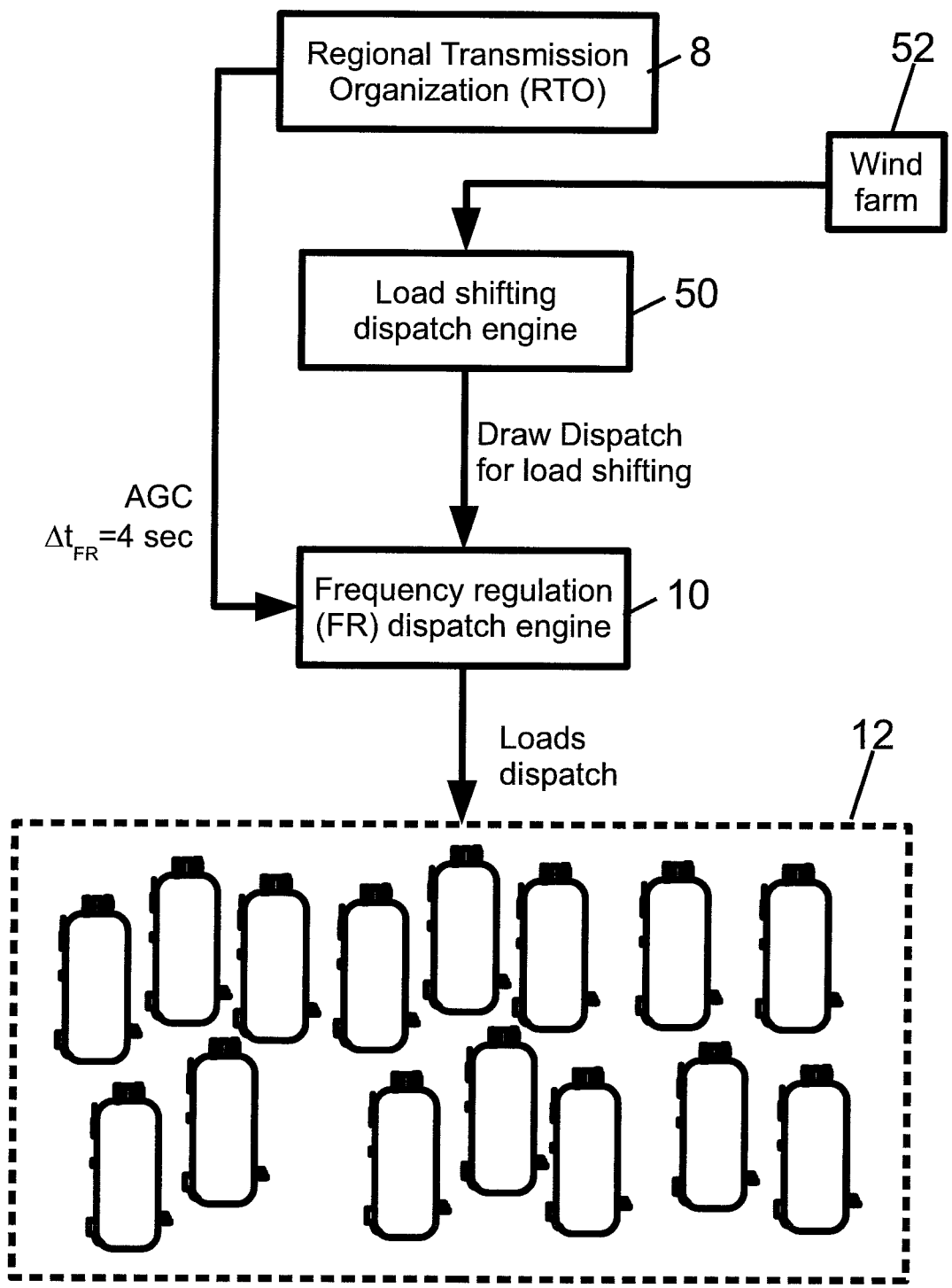
FIG. 4 diagrammatically shows a demand response system employing an aggregation of loads used to provide both frequency regulation on a time scale on the order of seconds and load shifting on a time scale of minutes to hours.

With reference to FIG. 4, the disclosed hierarchical approach for simultaneously servicing different tasks can also be implemented as a function of time, rather than as a function of space. In illustrative FIG. 4, the aggregation of loads 12 is not divided into sub-aggregations as a function of space. However, processing is divided as a function of time. The FR dispatch engine 10 operates to directly generate load dispatches for the loads of the aggregation 12. In a typical electrical grid in the United States, the RTO 8 updates the AGC signal about every four seconds ($\Delta t_{FR}=4$ sec). Thus, the FR is a relatively fast process. By comparison, some other ancillary grid services, such as peak shaving or supplying spinning reserve, are performed on a longer time scale. For example, in FIG. 4 it is indicated that the RTO 8 generates a load shifting command which is in effect for a time period ($\Delta t_{LS}$) on the order of minutes to hours. By way of illustration, the load shifting command may be executed during times of peak load and commands load shifting-compliant loads to reduce their power draw, or turn off completely.

As diagrammatically indicated in FIG. 4, the aggregation of loads 12 simultaneously provides both FR and load shifting. To this end, the FR dispatch engine 10 operates on the rapid time basis of the AGC update ($\Delta t_{FR}$=4 sec) to provide frequency regulation based on the AGC signal. At the same time, a load shifting dispatch engine 50 operates to control the loads 12 to provide the load shifting ancillary service. For example, the load shifting may adjust the load based on power output of a wind farm 52, by increasing the draw of the aggregation 12 when the wind farm is generating a high level of electrical power (due to favorable winds) and decreasing the draw of the aggregation 12 when the wind farm is generating a lower level of electrical power (due to a lack of wind, or due to very high winds that require shut-down of the wind farm 52). To this end, the wind farm 52 communicates information about its current power generation level to the load shifting dispatch engine 50, which adjusts a draw dispatch for load shifting on a relatively long time scale ($\Delta t_{LS}$) typically on the order of minutes to hours, corresponding to the time frame over which wind conditions are likely to change. By contrast, the modulation of the aggregation draw produced by the FR dispatch engine 10 to achieve FR is on a shorter time frame ($\Delta t_{FR}$=4 sec), and is expected to average out to about zero over the longer time frame ($\Delta t_{LS}$), as the FR causes the actual dispatched draw to vary approximately symmetrically, on average, above and below the scheduled baseline draw.

In view of the foregoing, it is disclosed to simultaneously provide an ancillary service having a longer term (e.g. load shifting) and an ancillary service having a shorter term (e.g. FR) as follows. The ancillary service having the longer time frame is performed first to produce a modified baseline scheduled power draw that is averaged over the longer term that is then modulated by the ancillary service having the shorter term. In the illustrative example of FIG. 4, the ancillary service having the longer time frame is performed by the load shifting dispatch engine 50 to produce a modified baseline scheduled power draw that is averaged over the longer term ($\Delta t_{LS}$). This load-shifted baseline is then modulated at the shorter time frame ($\Delta t_{FR}$) by the FR dispatch engine 10 to produce the frequency regulation, and the load dispatches are generated based on this aggregation power draw that accounts for both the load shifting and FR. While described in the context of combined load shifting and FR, it will be appreciated that other ancillary services operating at significantly different time scales may be similarly combined, by meeting the longer term objective first and then modifying this "modified baseline" to meet the shorter term objective.

Figure 5:
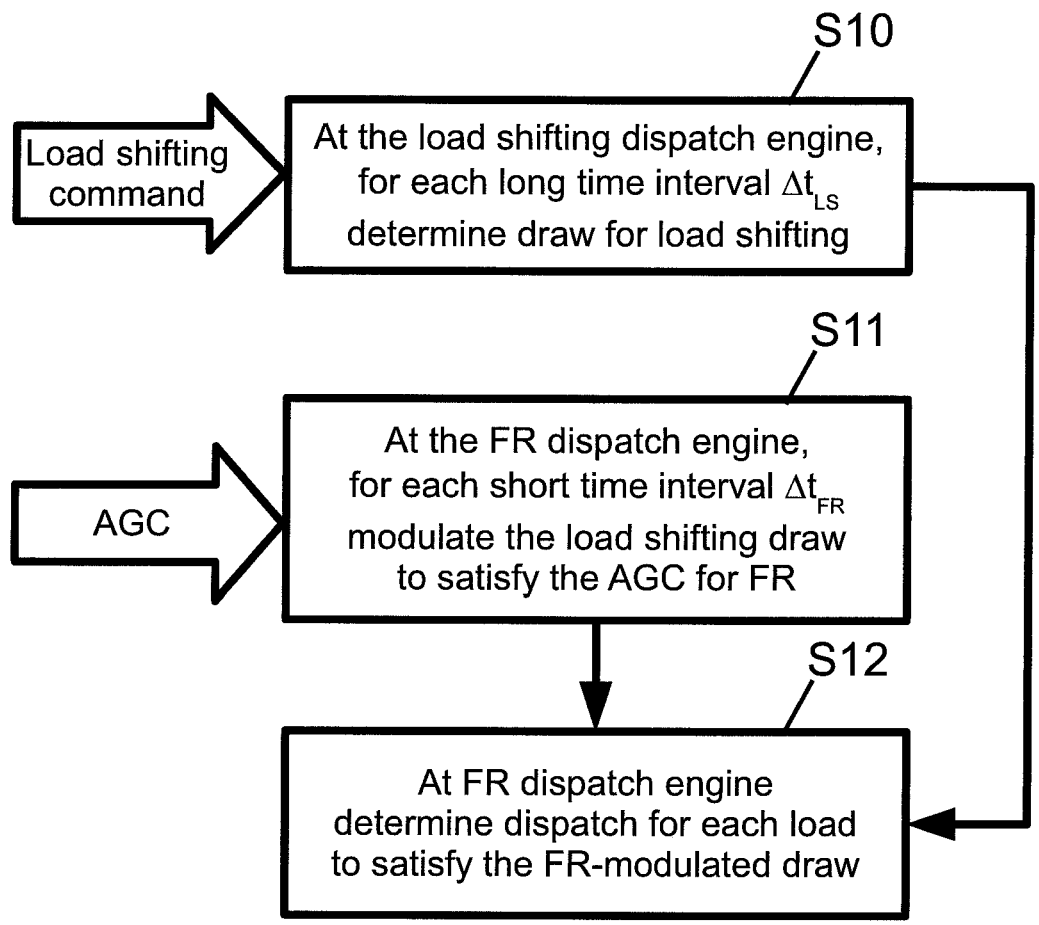
FIG. 5 diagrammatically shows a method of providing ancillary grid services including both frequency regulation and load shifting suitably performed by the demand response system of FIG. 4.

With reference to FIG. 5, a process performed by the system of FIG. 4 is described. In an operation S10, the load shifting dispatch engine 50 determines a load shift draw dispatch for the aggregation 12 to satisfy a load shifting command (for example, embodied as the current level of power generation indicated by the wind farm 52 or indicated by a photovoltaic farm or other intermittent power generation source, or in an alternate embodiment as a load shifting command issued by the RTO 8) over the time interval $\Delta t_{LS}$ which is typically of order minutes to hours. In an operation S11, the FR dispatch engine 10 modifies (i.e. modulates) the load shift draw dispatch on the FR time scale ($\Delta t_{FR}$~4 sec) to provide a draw dispatch responsive to the AGC signal. Said another way, this draw dispatch is relative to the load shift draw dispatch, which is treated as a baseline schedule for the FR. Advantageously, over the longer time interval $\Delta t_{LS}$ these FR modulations (deviations from the load shift draw dispatch baseline) are likely to average out to about zero, so that operation of the FR dispatch engine 10 to provide frequency response does not substantially impact operation of the load shifting dispatch engine 50. Optionally, a constraint can be added that the FR modulations average to zero over a designated time frame. In an operation S12, at the FR dispatch engine 10 the individual load dispatches are determined in order to satisfy the FR-modified draw dispatch.

While certain optimization goals and inputs/constraints have been employed in the foregoing illustrative examples, additional or other goals and inputs/constraints, alone or in various combinations, may be considered for the aggregation and various sub-aggregations (in embodiments such as those of FIGS. 1-3), or for the aggregation on various time scales (in embodiments such as those of FIGS. 4-5). Some suitable illustrative goals of optimization for a certain control signal may, for example include: voltage level; maximizing revenue; minimizing must-run and must-not-run conditions; maximizing probability of load availability for FR, load shifting, or some other service; minimizing switching fatigue in loads that are switched on/off; and minimizing thermal losses. Some suitable illustrative constraints and inputs for assessing these goals may, for example include: price of electricity (hourly or on some other time scale); temperature band for a load (for example, the permissible hottest and lowest water temperatures for an electric water heater, or room temperature range permissible to maintain customer comfort when controlling an air conditioner or furnace); switching frequency in loads that are switched on/off; and thermal losses. Combinations of goals, inputs, and constraints may in general be represented by a performance measure parameterized by the draw dispatches of the loads (and/or sub-aggregations), and the draw dispatches are then generated by adjusting the draw dispatches to optimize the performance measure using a suitable mathematical optimization algorithm. In illustrative embodiments herein, the performance measure is a cost function, and the optimization entails minimizing the cost function.

By way of further illustrative example, hourly regulation prices are expected to be periodic with a frequency on the order of one day, with longer-term periodicity due to other intervals such as weekly or yearly intervals. It is thus straightforward to develop an estimate of electricity prices over such time intervals. The frequency regulation dispatch engine 10 in some embodiments optimizes operation of the aggregation to be most active/available during high price hours and least active/available during low price hours.

The availability of a water heater to be used in frequency regulation performed by the FR dispatch engine 10 at any given time is determined by its current tank temperature. If the water is at the maximum temperature, then no additional energy can be consumed until the water cools down or is drawn out from use. If the water is at the minimum temperature, then the water heater must run to add energy and cannot be controlled for frequency regulation purposes. In both cases, allowing the temperature to go outside of the max or min means that the water heater is no longer contributing to the aggregate capacity for providing frequency regulation, and hence this represents lost revenue.

Performance measures or cost functions can be incorporated into a generalized optimization as follows. The draw requirement for the aggregation or sub-aggregation can be generalized to $P_{req}=\Sigma_{e=1}^{N}P_e$ where $P_{req}$ denotes the draw requirement (for example, $P_{req}=P_{FR}$ for the frequency regulation draw requirement of Expression (1)) and the summation e=1, ..., N is over the loads or sub-aggregations that are aggregated to achieve the draw requirement (for example, N corresponds to the number of circuits C in the FR example of Expression (1)). This constraint is combined with any other constraints on the draw dispatches (e.g. setting the draw dispatch for a water heater to zero if its reported temperature is above the temperature band), and a cost function C summed over the N loads or sub-aggregations and over the G goals for which cost is to be optimized is minimized subject to these constraints:

$$C = \int_0^T \sum_{e=1}^N \sum_{g=1}^G w_g C_{e,g}(P_e) \text{ s.t. } P_{req} = \sum_{e=1}^N P_e \text{ and other constraints} \quad (3)$$

where T is the time horizon over which the cost is calculated, the summation over g=1, ..., G is over the G goals, the summation over e=1, ..., N is over the N loads or sub-aggregations, $C_{e,g}(P_e)$ is the cost associated with the $g^{th}$ goal for the $e^{th}$ load or sub-aggregation when the draw dispatch for the $e^{th}$ load or sub-aggregation is set to the value $P_e$, and $w_g$ is a priority weight assigned to the $g^{th}$ goal. In general, these costs $C_{e,g}(P_e)$ may be a function of various inputs, such as the current electricity price for a cost associated with purchasing the electricity, or water temperature of a load for a thermal losses cost. The constrained cost minimization of Expression (3) is minimized with respect to the set of draw dispatches $P_e$, e=1, ..., N.

In the hierarchical demand response system of FIGS. 1-3, Expression (3) is applied at each level of the hierarchy, where the "other constraints" are the constraints received from the next-lower level of the hierarchy. The summation e=1, ..., N is over the devices of the appropriate aggregation or sub-aggregation for that level, and the goals g=1, ..., G are also appropriate for the given level (for example, at the circuit level two goals may be to minimize power drawn by the circuit and to minimize power fluctuations on the circuit). Some levels may not have any goals, so that optimizing Equation (3) reduces to satisfying the constraint $P_{req}=\Sigma_{e=1}^N P_e$ along with the "other constraints"—that is, solving:

$$P_{req} = \sum_{e=1}^N P_e \text{ s.t. other constraints} \quad (4)$$

The "other constraints" suitably flow from the bottom of the hierarchy to the top of the hierarchy—for example, the power limits on the Circuits A.1 and A.2 of FIG. 3 flow upward to define the power limit on the combined Circuit A, and the power limits on Circuits A, B, C then serve as constraints on the FR optimization. Optimization processing of the draw dispatches suitably flows top-down so as to provide $P_{req}$ to each lower-level dispatch engine from the one above it in the hierarchy. For example, as described with reference to FIGS. 1 and 2, the FR dispatch engine 10 first operates (bound by constraints that flowed upward from the Circuits) to generate the circuit draw dispatches, and then at each circuit dispatch engine 20, 22, 24 the load dispatches for that circuit are optimized subject to the constraint $P_{req}=\Sigma_{e=1}^N P_e$ where $P_{req}$ is the draw dispatch for the circuit received from the FR dispatch engine 10 and the summation e=1, ..., N is over the loads serviced by that circuit.

Because the FR dispatch engine 10 determined the circuit dispatches subject to any circuit-level constraints, it is ensured that these circuit dispatches satisfy the constraints on the total power draw of the individual circuits. The constraint $P_{req}=\Sigma_{e=1}^N P_e$ at the circuit level ensures that the circuit meets the draw dispatch assigned to that circuit by the FR dispatch engine in order to meet the FR requirements, and additionally in the optimization of Expression (3) at the circuit dispatch engine level constraints at the load level flowed upward from the serviced loads are applied as the "other constraints" so as to ensure that the load dispatches satisfy any load-level constraints.

For the embodiment of FIGS. 4 and 5, a constrained cost function of the form of Expression (3) can be applied as well. Here, the aggregation 12 is not divided into sub-aggregations, so the "other constraints" comprise the load constraints. The load shifting engine computes the load shifting draw dispatch (denoted as $P_{LS}$), and Expression (3) is applied at the frequency regulation (FR) level and can be written as:

$$C = \sum_{l=1}^L \sum_{g=1}^G w_g C_{l,g}(P_l) \text{ s.t. } P_{LS} + \Delta P_{FR} = \sum_{l=1}^L P_l \text{ and load constraints} \quad (5)$$

where L is the number of loads in the aggregation 12 and the summation l=1, ..., L is over the loads of the aggregation 12. The term $\Delta P_{FR}$ is the modulation of the baseline power draw $P_{LS}$ determined for load shifting needed to provide frequency regulation. If the cost optimization is omitted, then Expression (5) reduces to solving:

$$P_{LS} + \Delta P_{FR} = \sum_{l=1}^L P_l \text{ s.t. load constraints} \quad (6)$$

for the load dispatches $P_l$. As previously noted, it is expected that the modulation $\Delta P_{FR}$ which is on the time scale $\Delta t_{FR}$ should average out to about zero over the longer time scale $\Delta t_{LS}$ of the load shifting dispatch $P_{LS}$, so that the FR modulation $\Delta P_{FR}$ does not adversely impact the load shifting performed on the longer time scale.

The dispatch engines 10, 20, 22, 24, 30, 32, 50 suitably comprise computers, network servers, or other electronic data processing devices that are programmed to perform the disclosed operations. The dispatch engines have suitable wired or wireless communication links with their downstream points (loads or sub-aggregations) and with the upstream dispatch engine (if any) in order to communicate the constraints and the draw dispatches as described. In the case of the FR dispatch engine 10 or other dispatch engines that update draw dispatches on a fast time scale, e.g. seconds, the draw requirements or bases therefor (e.g. the AGC signal) are suitably communicated electronically via wired or wireless communication links. On the other hand, a dispatch engine such as the load shifting dispatch engine 50 that responds to draw requirements that are updated on a longer time scale (minutes or hours) may optionally employ manual communication of the draw requirement or basis therefor. For example, a human operator may optionally convey information about the power generation output of the wind farm 52 to the load shifting dispatch engine 50 by telephone.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method operating on an aggregation of loads that draw electricity, the method comprising:
   determining a baseline long-term draw dispatch for the aggregation based on long-term draw requirement over a first time interval;
   modulating the baseline long-term draw dispatch over a second time interval shorter than the first time interval based on a short-term draw requirement to determine a draw dispatch for the aggregation;
   determining load dispatches for the loads of the aggregation to satisfy the draw dispatch for the aggregation;
   communicating the load dispatches to the loads of the aggregation; and
   operating the loads of the aggregation in accordance with the communicated load dispatches.

2. The method of claim 1 wherein the long-term draw requirement is a load shifting command.

3. The method of claim 2 wherein the load shifting command comprises an indication of the power generation level of a wind farm, photovoltaic farm, or other intermittent power generation source.

4. The method of claim 1 wherein the short-term draw requirement is a frequency regulation (FR) draw requirement generated based on an automatic generation control (AGC) signal.

5. The method of claim 1 wherein the short-term draw requirement averages to zero over the first time interval.

6. The method of claim 1 wherein the first time interval is on the order of minutes or hours and the second time interval is on the order of seconds.

7. The method of claim 1 wherein the modulating comprises determining a modulation term $\Delta P_{FR}$ of the baseline long-term draw dispatch $P_{LS}$ wherein the draw dispatch for the aggregation is $P_{LS}+\Delta P_{FR}$, and the determining of load dispatches for the loads of the aggregation to satisfy the draw dispatch $P_{LS}+\Delta P_{FR}$ for the aggregation comprises minimizing a total cost C using the constrained cost minimization:

$$C = \sum_{l=1}^{L} \sum_{g=1}^{G} w_g C_{l,g}(P_l) \text{ s.t. } P_{LS} + \Delta P_{FR} = \sum_{l=1}^{L} P_l \text{ and load constraints}$$

with respect to load dispatches $P_l$, where l=1, ..., L indexes the loads of the aggregation, g=1, ..., G indexes goals of the optimization, $w_g$ is a priority weight assigned to the $g^{th}$ goal, and $C_{l,g}(P_l)$ is a cost associated with the $g^{th}$ goal for load l.

8. The method of claim 1 wherein the modulating comprises determining a modulation term $\Delta P_{FR}$ of the baseline long-term draw dispatch $P_{LS}$ wherein the draw dispatch for the aggregation is $P_{LS}+\Delta P_{FR}$, and the determining of load dispatches for the loads of the aggregation to satisfy the draw dispatch $P_{LS}+\Delta P_{FR}$ for the aggregation comprises solving:

$$P_{LS} + \Delta P_{FR} = \sum_{l=1}^{L} P_l \text{ s.t. load constraints}$$

to determine the load dispatches $P_l$, where the summation l=1, ..., L is over the loads of the aggregation.

9. A system for operating an aggregation of loads, comprising:
   an aggregation comprising loads that draw electricity; and
   a load shifting dispatch engine in communication with an associated intermittent power generation source and the aggregation, wherein the load shifting dispatch engine comprises an electronic data processing device and is configured to:
   determine a baseline long-term draw dispatch for the aggregation based on a long-term draw requirement over a first time interval,
   modulate the baseline long-term draw dispatch over a second time interval shorter than the first time interval based on a short-term draw requirement to determine a draw dispatch for the aggregation,
   determine load dispatches for the loads of the aggregation to satisfy the draw dispatch for the aggregation, and
   communicate the load dispatches to the loads of the aggregation;
   wherein the loads of the aggregation operate in accordance with the communicated load dispatches.

10. The system of claim 9, wherein the long-term draw requirement is a load shifting command.

11. The system of claim 10 wherein the load shifting command comprises an indication of the power generation level of the intermittent power generation source.

12. The system of claim 11, wherein the intermittent power generation source includes a wind farm or a photovoltaic farm.

13. The system of claim 9 wherein the short-term draw requirement is a frequency regulation (FR) draw requirement generated via an associated frequency regulation dispatch engine comprising an electronic data processing device based on an automatic generation control (AGC) signal.

14. The system of claim 9 wherein the short-term draw requirement averages to zero over the first time interval.

15. The system of claim 9 wherein the first time interval is on the order of minutes or hours and the second time interval is on the order of seconds.

16. The system of claim 9, wherein the loads that draw electricity are selected from the group comprising heating-ventilation-air conditioning (HVAC) units, dishwashers, or water heaters.

17. The system of claim 9, wherein the modulating comprises determining a modulation term $\Delta P_{FR}$ of the baseline long-term draw dispatch $P_{LS}$ wherein the draw dispatch for the aggregation is $P_{LS}+\Delta P_{FR}$, and the determining of load dispatches for the loads of the aggregation to satisfy the draw dispatch $P_{LS}+\Delta P_{FR}$ for the aggregation comprises minimizing a total cost C using the constrained cost minimization:

$$C = \sum_{l=1}^{L} \sum_{g=1}^{G} w_g C_{l,g}(P_l) \text{ s.t. } P_{LS} + \Delta P_{FR} = \sum_{l=1}^{L} P_l \text{ and load constraints}$$

with respect to load dispatches $P_l$, where $l=1, \ldots, L$ indexes the loads of the aggregation, $g=1, \ldots, G$ indexes goals of the optimization, $w_g$ is a priority weight assigned to the $g^{th}$ goal, and $C_{l,g}(P_l)$ is a cost associated with the $g^{th}$ goal for load l.

18. The system of claim 9, wherein the modulating comprises determining a modulation term $\Delta P_{FR}$ of the baseline long-term draw dispatch $P_{LS}$ wherein the draw dispatch for the aggregation is $P_{LS}+\Delta P_{FR}$, and the determining of load dispatches for the loads of the aggregation to satisfy the draw dispatch $P_{LS}+\Delta P_{FR}$ for the aggregation comprises solving:

$$P_{LS} + \Delta P_{FR} = \sum_{l=1}^{L} P_l \text{ s.t. load constraints}$$

to determine the load dispatches $P_l$, where the summation $l=1, \ldots, L$ is over the loads of the aggregation.

* * * * *